W. A. PETERSEN.
ELECTRICAL SCALE.
APPLICATION FILED OCT. 11, 1919.
1,405,322.
Patented Jan. 31, 1922.
3 SHEETS—SHEET 1.
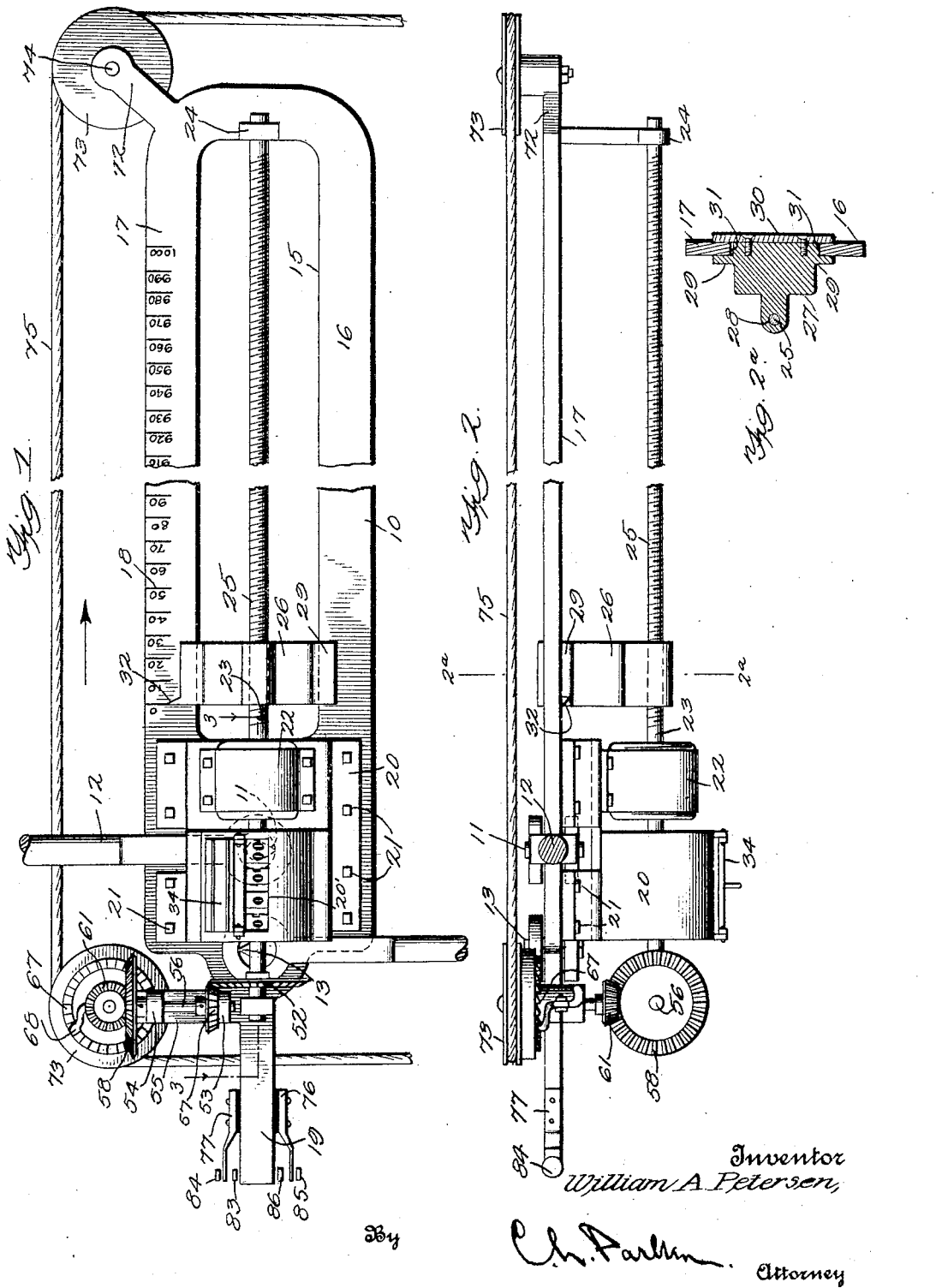
Inventor
William A. Petersen,
By
C. H. Parker,
Attorney

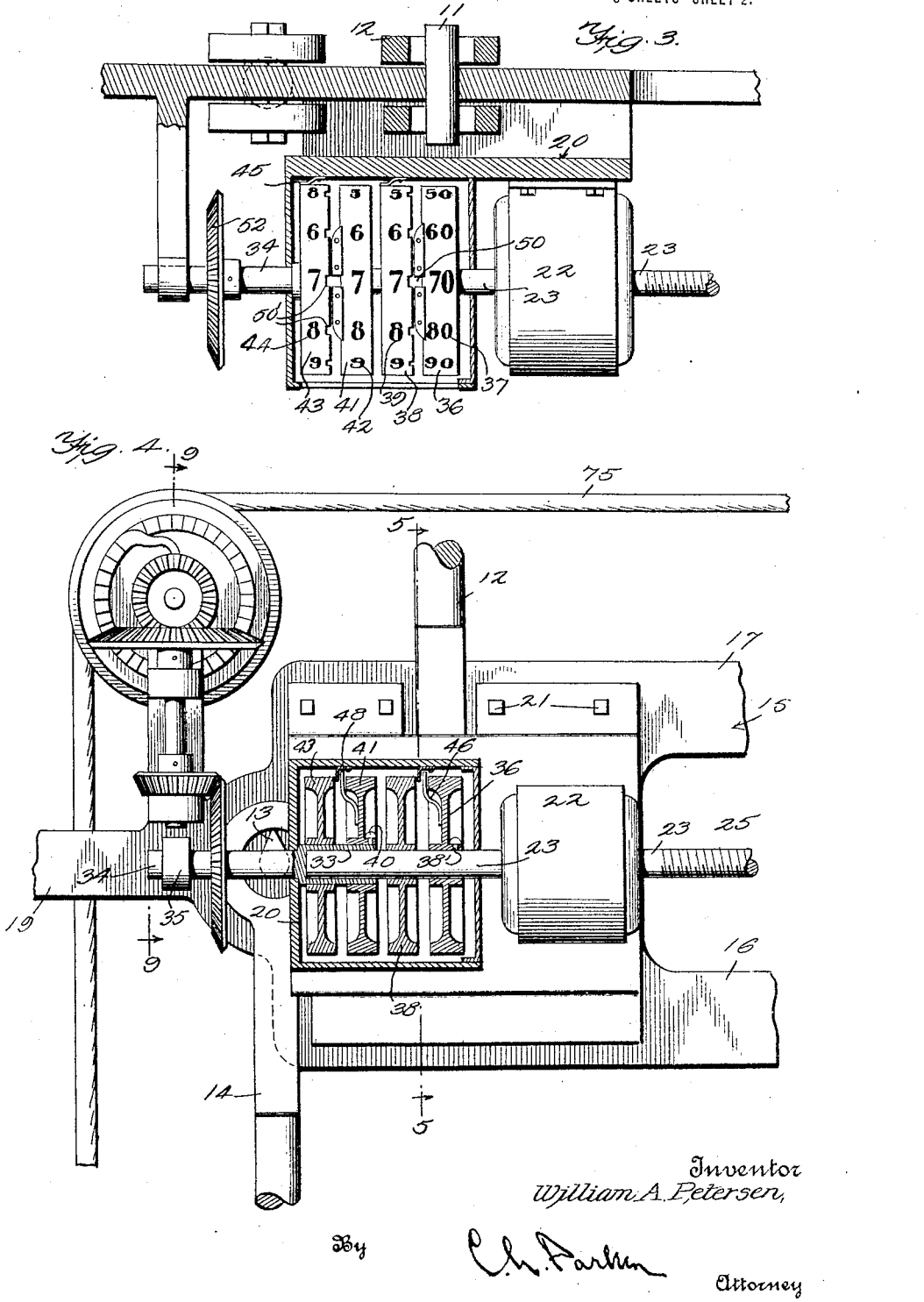

W. A. PETERSEN.
ELECTRICAL SCALE.
APPLICATION FILED OCT. 11, 1919.
1,405,322.
Patented Jan. 31, 1922.
3 SHEETS—SHEET 3.
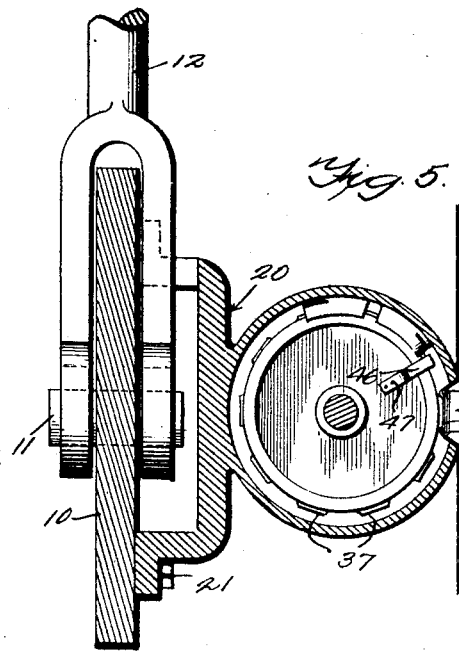
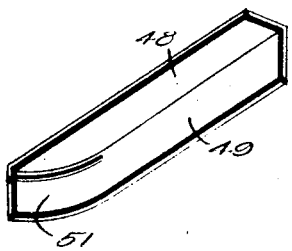
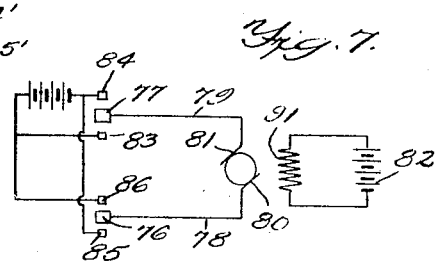
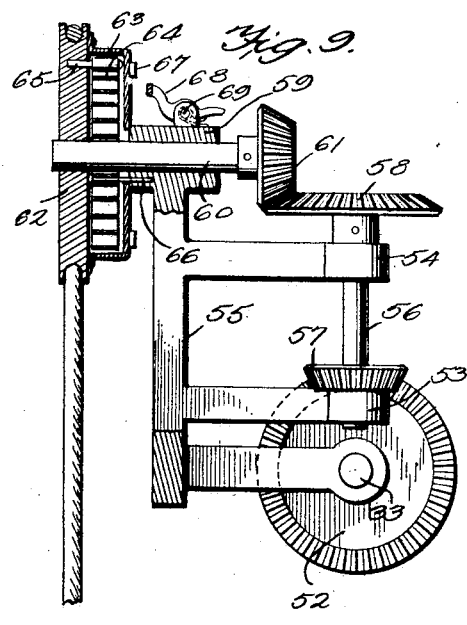
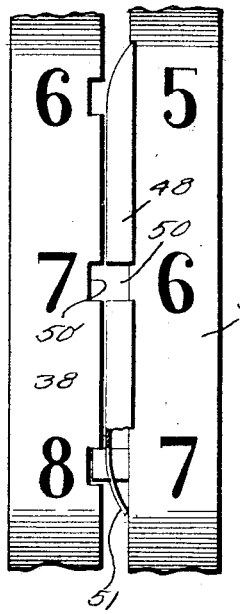
Inventor
William A. Petersen,
By
Attorney

UNITED STATES PATENT OFFICE.

WILLIAM A. PETERSEN, OF EXCELSIOR SPRINGS, MISSOURI, ASSIGNOR OF ONE-HALF TO JAMES J. MURPHY, OF EXCELSIOR SPRINGS, MISSOURI.

ELECTRICAL SCALE.

1,405,322.  Specification of Letters Patent.  Patented Jan. 31, 1922.

Application filed October 11, 1919. Serial No. 329,984.

*To all whom it may concern:*

Be it known that I, WILLIAM A. PETERSEN, a citizen of the United States, residing at Excelsior Springs, in the county of Clay and State of Missouri, have invented certain new and useful Improvements in Electrical Scales, of which the following is a specification.

This invention relates to improvements in electrical scales.

An important object of the invention is to provide a scale which is semi-automatic in operation.

A further object of the invention is to improve the construction shown in my Patent 1,302,085. I have found in practice that where the operating motor is shifted longitudinally of the scale beam, the graduations of the scale beam, due to the weight of the motor, must be so fine as to render their reading difficult. In order to eliminate this fallacy I have devised a scale in which the motor is stationary, and is secured to the beam in such a position that its center of gravity lies co-incident with that of the scale beam. The shaft of this motor drives a small weight having an index finger co-operating with the usual scale. For greater weights than may be computed upon the beam by the small weight, I have devised a hand operated register adapted to cooperate with the register of the motor, all as hereinafter more fully described.

Other objects and advantages will be apparent throughout the course of the following description.

In the accompanying drawings wherein for the purpose of illustration is shown a preferred embodiment of my invention and wherein like numerals designate like parts throughout.

Figure 1 is a side elevation of a scale beam embodying my invention.

Figure 2 is a plan view thereof.

Figure 2ª is a section taken on the line 2ª—2ª of Figure 2.

Figure 3 is an enlarged horizontal section showing the scale register.

Figure 4 is a section taken at right angles throughout shown in Figure 3.

Figure 5 is an enlarged section taken on the line 5—5 of Figure 4.

Figure 6 is a perspective of one of the cam tracks.

Figure 7 is a diagrammatic view showing the circuits to the motor.

Figure 8 is a detailed view showing the mechanism for shifting the scale chart.

Figure 9 is a section taken on a line 9—9 of Figure 4, and

Figure 10 is a perspective of the pawl used for locking the manually operated weight shifting apparatus.

Referring now more particularly to the drawings the numeral 10 indicates a scale beam having a pivot 11 adapted to cooperate with the suspension member 12, to balance the beam. The beam 10 is also provided with the usual pivot 13, cooperating with the suspension member 14, which will be provided with the usual weight receiving surface (not shown).

The beam 10 is formed with a central aperture forming opposed parallel arms 16 and 17, the arm 17 being provided with indicia 18 reading from 0 to 1,000 for a purpose hereinafter to appear. Secured to the beam 10 as at 21 is a casing 20 upon which is secured a motor 22. The armature shaft 23 of the motor extends longitudinally of the beam 10 and has its forward end journaled in a bracket 24 formed upon the beam. The shaft 23 is provided with screw threads 25 adapted to cooperate with a weight 27, as at 28. The weight 27 is provided with flanges 29, which cooperate with the plate 30 secured to the weight to form grooves 31 adapted to receive the arms 16 and 17 of the beam 10. It will be seen that rotation of the shaft 23 shifts with weight 27 longitudinally of the beam 10, the direction of the shifting of the weight being dependent on the direction of rotation of the shaft 23. One of the flanges 29 is provided with a finger 32 cooperating with the indicia 18 of the arm 17.

The opposite end of the armature shaft 23 is journaled in an axial socket 33 formed in a shaft 34. The shaft 34 is journaled in the casing 20 and in a bracket 35 secured upon an extension 19 formed upon the rear end of the scale beam 10.

Secured to the armature shaft 23 as at 38' is a roll 36 provided upon its face with indicia 37 reading from 0 to 90. Rotatably mounted upon the shaft 23 is a second roll 38 bearing upon its face indicia 39 reading from 0 to 9.

Secured to the shaft 34 as at 40 is a third roll 41 bearing upon its face indicia 42 reading from 0 to 9 and rotatably mounted upon the same shaft is yet a fourth roll 43 bearing indicia 44 similar to the indicia of rolls 39 and 41.

The turning movement of each of the rotatable calculating rolls 33 and 43 is retarded, by means of a friction element or spring 45 contacting with the periphery thereof, and secured to the casing 19, as more clearly shown in Figure 3.

Each of the rolls 36 and 41 is provided with radially extending resilient lock devices or fingers 46 attached thereto, as shown at 47. The outer or free ends of the resilient lock device or fingers project outwardly beyond the periphery of these rolls and are arranged in cooperative relation to stationary cam tracks or shifting devices 48. The rolls 38 and 43 are provided with radially extending recesses or notches 50', each roll being provided with ten of such recesses or notches, equidistantly spaced and arranged in cooperative relation with the indicia thereof.

The cam tracks or shifting devices 48 are longitudinally curved, stationary, and attached to the interior of the casing or drum 19. Each device 48 is provided with a shifting flange 49, which is spaced from the rolls carrying the resilient finger 46. The flanges 49 are straight throughout the greater portion of their length and their inner ends are straight and spaced, providing a passage 50 therebetween, adapted for registration with the notches 50'. The outer ends of the flanges 49 are separated from the body portion of the device 48 and are in the form of an inclined or angularly arranged resilient member 51 extending toward the roll carrying the resilient finger 46. Two of the devices 48 are employed in connection with each corresponding roll, for properly actuating the resilient finger 46, when the corresponding roll is rotated in opposite directions.

The roll 36 is the "tens" roll, the roll 38 the "hundreds" roll, the roll 41 the "thousands" roll and roll 51 the "ten thousands" roll. When the "tens" roll 36 has made a complete revolution, the "hundreds" roll 33 is turned one step, bringing the numeral "1" into view. When the "thousands" roll 41 has made a complete revolution the "ten thousands" roll is advanced one step.

The operation of the means for advancing one roll a step when the adjacent roll has made a complete revolution, will be readily understood from an inspection of Figure 8. Assuming that the "tens" roll 36 is being turned in the direction of the arrow, in Figure 10 the resilient lock finger 46 thereof is brought into contact with the inclined end 51 of the flange 49 and is shifted laterally to enter the adjacent recess 50 in the "hundreds" roll 38. It is thus apparent that the rolls 36 and 38 are now locked for rotation together, and the continued turning movement of the roll 28 will advance the roll 38 until the numeral "1" of the roll 36 assumes the active position, at which time the spring finger 46 is adjacent the passage 50. This finger being tensioned to move toward the roll 36, automatically moves into the passage 50 to assume a position inwardly of the flanges 49 thereby automatically unlocking the rolls 36 and 38. The continued turning movement of the roll 36 does not further rotate the roll 38, and the spring finger 46 is adapted to pass beneath the resilient extension 51 of the other track 48. As this operation occurs upon every complete revolution of the roll 36 it is obvious that the roll 34 is advanced a step for such complete operation. Upon the rotation of the roll 38 being reversed, the spring arm 35 contacts with the angularly arranged end 51 of the other track 48, and the roll 36 is turned a step in the opposite direction, for each complete revolution of the roll 38. It is believed that no further explanation of this operation is necessary except to state that the roll 43 is advanced by the roll 41 in a similar manner.

Secured to the shaft 34 is a bevel gear 52. Mounted in journals 53 and 34 formed on the vertical extension 55 of the extension 19 is a shaft 56. Secured to the shaft 56 at its lower end is a bevel pinion 57 which meshes with the bevel gear 52. Secured to the upper end of the shaft 56 is a bevel gear 58. Mounted in the journal 59 formed in the upper end of the extension 55 is a horizontal shaft 60 provided with a bevel gear 61 meshing with the gear 58. Secured to the opposite end of the shaft 60 is a grooved pulley 62, having secured thereto a spring casing 63. Mounted within the spring casing 63 and surrounding the shaft 60 is a spring 64, one end of which is secured to the grooved pulley 62 as at 65, the other end of which is secured to the journal 59 as at 66.

Formed upon the face of the spring casing 63 is a ratchet 67. A pawl 68 is provided, pivoted to the journal 59 as at 69. The rack engaging jaw 70 of the pawl 68 is held in engagement with the rack 67 by means of a spring or the like, and a thumb piece 71 is provided to withdraw the jaw 70 from such engagement.

A bracket 72 is formed upon the upper surface of the forward end of the beam 10. A grooved pulley 73 is mounted to said bracket as at 74 and a cable 75 is passed over the pulleys 62 and 73. The cable 75 is made of fairly heavy material, such as wire or cable, and is adapted to overbalance the scale when a greater amount of cable is depending from one side than from the other. When the scale is first placed in operation and balanced, the cable is arranged over the pulleys 73 and 74 with the same amount of cable suspended on each side of the scale. The thousands roll 41 is geared to the shaft 60 on which the groove pulley 62 is mounted in such ratio that movement of the cable a certain distance will revolve the shaft and the thousands roll sufficient to indicate a thousand pound weight. The weight of the cable employed is proportioned so that the leverage from the pivot 11 to the point 74 times the weight of the cable moved from one side to the other will equal the weight of the material in the pan times the distance between the pivot 11 and suspension 13 and the scale will balance. It will be seen that if the cable 75 is drawn in the direction of the arrow on Figure 1 that the thousands roll is actuated through medium of gears 61, 58, shaft 56, gears 53 and 52 and shaft 33. If this motion is carried far enough to cause more than one complete rotation of the thousands roll 41, the rotation is imparted to the 10 thousands roll 43 as above described. The type upon the rolls is raised and is visible through an opening 20' formed in the casing 20 and a member 34' is pivoted near this opening to move therein. The member 34' is provided with devices 35' to receive a ticket. This device is adapted to move a ticket into contact with the raised type to print the weight thereon, the beam 10 being then held against movement by any suitable means.

Secured to the extension 19 and insulated therefrom are contacts 76 and 77 connected by wires 78 and 79 to the contact brushes 80 and 81 of the motor. The field winding 81 of the motor is supplied with current from a separate source 82. The contact 77 is arranged intermediate contacts 83 and 84, connected with the positive and negative poles of a battery respectively. The contact 76 is arranged intermediate contacts 85 and 86 connected with the negative and positive poles of the battery respectively. It will be seen that if the forward end of the beam 10 is raised that the contacts 76 and 77 come into engagement with the contacts 85 and 83 respectively and the shaft 23 of the motor is rotated in a clockwise direction. If however the forward end of the beam is lowered, the contacts 76 and 77 engage the contacts 86 to 84 respectively to the shaft 23 is rotated in a counter clockwise direction.

The operation of my device is as follows:

When a weight is placed upon the pan of the scales the forward end of the beam 10 is elevated and the shaft 23 rotated in a clockwise direction moving the weight 26 to the right and rotating the roll 36. Assuming that the weight placed upon the pan weighs less than a thousand pounds weight 26 shifts to the right along the beam and, due to inertia slightly past the point of correct weight of the article placed upon the pan. The beam 10 will now swing downwardly and the motor is reversed shifting the weight to the left, until it attains its proper position. It will be seen that this reversing of the motor and the shifting of the weight will be continued until the beam 10 is balanced and that the correct weight will be shown not only by the pointer 32 carried by the weight, but will be visible in the opening 20' of the casing. If the weight of the article to be weighed exceeds one-thousand pounds, when the weight 26 passes the thousand mark, the operator pulls the cable over the pulley 73 sufficient to give an indication on the thousands and ten thousands roll in units. If, for instance, more than two-thousand pounds are being weighed, the cable will be pulled over until the figure 2 registers on the thousands roll throwing the rear end of the scale beam upwardly and moving the weight 29 inwardly until it reaches the point where a balance is obtained when the circuit will be broken and the proper weight given. The weight of the cable employed is determined and the leverage is such that the weight of the cable times the distance from the pivot to the end of the scale beam may be properly figured to determine the revolution of the shaft and properly place the cable.

As many changes are possible in the shape, size and arrangement of the various parts shown, I do not limit myself to the specific construction herein shown and described but may make any such changes without departing from the spirit of the invention or the scope of the subjoined claims.

What I claim is:

1. In a scale of the type described the combination with a beam provided with the usual indicia, of a motor mounted upon said scale beam and having its armature shaft extending longitudinally thereof, screw threads formed upon said shaft, a balance weight adapted to coact with said indicia mounted upon said shaft and engaging the screw threads thereof, means to cause the motor to rotate in opposite directions, a roll secured to said armature shaft and bearing indicia upon the periphery thereof, a second roll rotatably mounted upon said shaft, means for preventing free rotation of said rotatable roll, means for advancing said rotatable roll one step for each complete rotation of said roll secured to the armature shaft, grooved pulleys mounted upon said beam, a cable passing about said pulleys and adapted to be shifted manually in one direction, a spring to return the cable to its normal position, a shaft mounted upon said beam and bearing a pair of rolls having indicia upon their faces, means operated by the rotation of one of said rolls for advancing the other of said rolls one step for each complete rotation of the first named roll, said rolls coacting with the rolls upon said armature shaft to give a weight total, and means connecting said shaft and one of said grooved pulleys.

2. In a scale of the type described the combination with a beam provided with the usual indicia, of a motor mounted upon said scale beam and having its armature shaft extending longitudinally thereof, screw threads formed upon said shaft, a balance weight adapted to coact with said indicia mounted upon said shaft and engaging the screw threads thereof, means to cause the motor to operate in one direction when the pivoted beam is swung upwardly, means to cause the motor to operate in the opposite direction when the beam is swung downwardly, a roll secured to said armature shaft and bearing indicia upon the periphery thereof, a second roll rotatably mounted upon said shaft, means for preventing free rotation of said rotatable roll, means for advancing said rotatable roll one step for each complete rotation of said roll secured to the armature shaft, grooved pulleys mounted upon said beam, a cable passing about said pulleys and adapted to be shifted manually in one direction, a spring to return the cable to its normal position, a shaft mounted upon said beam and bearing a pair of rolls having indicia upon their faces, means operated by the rotation of one of said rolls for advancing the other said rolls one step for each complete rotation of the first named roll, said rolls coacting with the rolls upon said armature shaft to give a weight total and means connecting said shaft and one of said grooved pulleys.

3. In a scale of the type described, the combination with a beam provided with the usual indicia, of a balance weight adapted to coact with said indicia shiftable longitudinally of said beam and adapted to balance the beam below a given weight limit, power means for shifting said weight to balance said beam, and a manually shiftable cable associated with said beam and adapted to overbalance said beam for balancing weights above said weight limit.

4. In a scale of the type described, the combination with a beam provided with the usual indicia, of a balance weight adapted to coact with said indicia shiftable longitudinally of said beam and adapted to balance the beam below a given weight limit, power means for shifting said weight to balance said beam, a manually shiftable cable associated with said beam and adapted to be shifted to overbalance said beam for balancing weights above said weight limit, means for visibly registering the weight balanced by said first named balance weight and means for visibly registering the weight balanced by said cable.

5. In a scale of the type described, the combination with a beam provided with the usual indicia, of a balance weight adapted to coact with said indicia shiftable longitudinally of said beam and adapted to balance the beam below a given weight limit, power means for shifting said weight to balance said beam, a manually shiftable balance weight associated with said beam and adapted to be shifted to overbalance said beam for balancing weights above said weight limit, means for visibly registering the weight balanced by said first named balance weight and means for visibly registering the weight balanced by said manually operated balance weight, the registering means of said balance weights coacting to provide a total.

In testimony whereof I affix my signature in presence of two witnesses.

WILLIAM A. PETERSEN.

Witnesses:
L. E. BATES,
CHARLES G. BARGUE.